United States Patent [19]
Garcea

[11] 3,906,722
[45] Sept. 23, 1975

[54] EXHAUST SYSTEM FOR INTERNAL COMBUSTION ENGINES

[75] Inventor: Giampaolo Garcea, Milan, Italy

[73] Assignee: Alfa Romeo, S.p.A., Milan, Italy

[22] Filed: Feb. 5, 1974

[21] Appl. No.: 439,943

Related U.S. Application Data

[63] Continuation-in-part of Ser. No. 421,643, Dec. 4, 1973, abandoned, which is a continuation of Ser. No. 182,654, Sept. 22, 1971, abandoned.

[30] Foreign Application Priority Data
Sept. 22, 1970 Italy .................................. 30057/70

[52] U.S. Cl. .................................... 60/289; 60/293
[51] Int. Cl.[2] ........................................... F01N 3/10
[58] Field of Search ...................... 60/293, 289, 290

[56] References Cited
UNITED STATES PATENTS

| | | | |
|---|---|---|---|
| 3,641,767 | 2/1972 | Kraus .................................. | 60/274 |
| 3,653,212 | 4/1972 | Gast .................................... | 60/293 |
| 3,662,541 | 5/1972 | Sawada ............................... | 60/293 |

*Primary Examiner*—Douglas Hart
*Attorney, Agent, or Firm*—Holman & Stern

[57] ABSTRACT

A pollution-preventing system for the discharge of the exhaust of an internal combustion engine, in which a set of automatic valves allows atmospherical air to be admixed with the hot exhaust in the exhaust pipes. The valves are opened by negative pressures as they cyclically occur in the exhaust pipes and are closed by a resilient bias action. Post-combustion of the exhaust gases due to the air admixture can be supplemented by catalytic action or thermal insulation to keep the exhaust hot.

5 Claims, 8 Drawing Figures

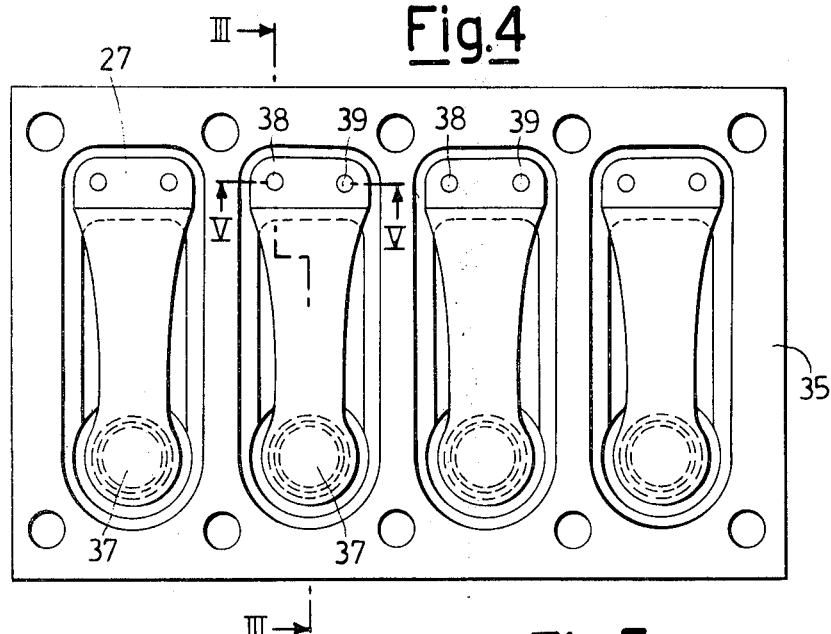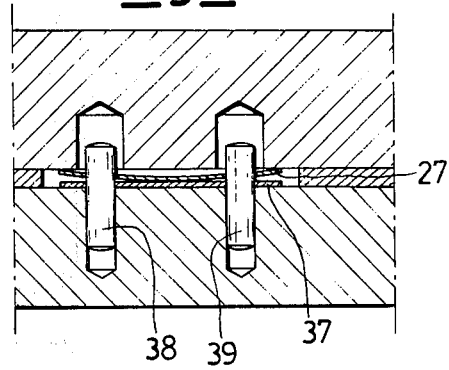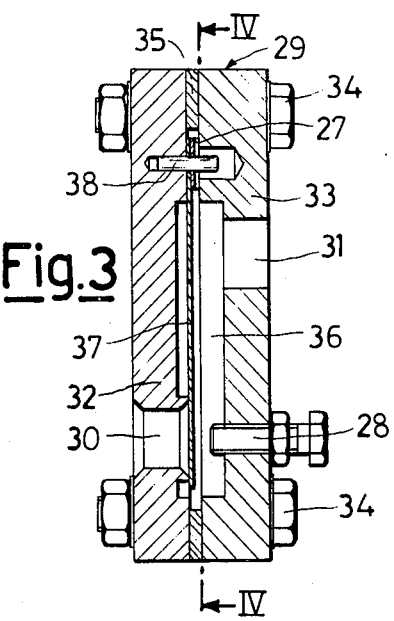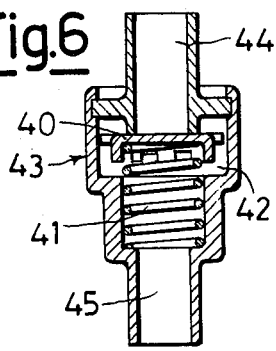

EXHAUST SYSTEM FOR INTERNAL COMBUSTION ENGINES

This is a Continuation in Part Application of my earlier application Ser. No. 421,643, filed Dec. 4, 1973 which in turn is a continuation of application Ser. No. 182,654, filed Sept. 22, 1971, both of which are now abandoned.

BACKGROUND OF THE INVENTION

The basic problem in the operation of internal combustion piston engines has become, in recent years, that of abating all those substances, which are present in the exhaust gases and are susceptible of causing air pollution.

These substances are essentially carbon monoxide and unburned hydrocarbons. The amount of these pollutants as contained in the exhaust gases can be decreased, as is known, by special expedients which are adapted to improve the combustion in the explosion chamber of an engine.

Improved results, however, can be obtained by causing an oxidation reaction to occur after that the gases have left the explosion chamber of an engine. To this end, an appropriate amount of air should be supplied to the gases and the air-gas exhaust mixture should then be brought to such conditions that the oxidation reaction may take place.

PRIOR ART

The paths as followed up to now in order to complete such an oxidation generally consist in installing on the engine a pump which supplies the post-combustion air, and the possible modification of the exhaust installation, for example, by introducing therein mufflers in which the post-combustion may take place. Such mufflers can contain, or not, catalysts for the oxidation reaction. In the former case, "catalytic mufflers" are spoken of, with "thermal reactors" being mentioned in the latter case.

The defect of such approaches, especially from the point of view of their application to engines of the European type, is that of causing considerable power losses both since they require the expenditure of a certain amount of power for driving the air pump, and due to the fact that they originate high exhaust backpressures.

OBJECTS AND SUMMARY OF THE INVENTION

The device of the present patent application aims at solving these problems by acting in such a way as to obtain a pollution-preventing action for the exhaust gases without any power loss inasmuch as no air pump is to be installed, and due to the fact that exhaust backpressures at full power are prevented. The present device solves, above all, the problem of introducing into the post-combustion muffler the air which is necessary to the oxidation reaction without resorting to the installation of an air pump and this both relatively to the cost and the power absorption thereof. To the latter end, the device utilizes the trend of the pressures in the exhaust pipes: the value of the pressure in the exhaust pipes varies, as is known, periodically in time and there are time intervals in which negative pressures are established in the tubes. To allow air to be drawn in, the present device utilizes said negative pressures by the use of automatic valves which are opened as soon as the pipes in which the valves are mounted have a negative pressure in their interior, with said valves being closed as soon as the pipes have a positive pressure therein, so as to prevent gases escaping towards the outside.

Further improvements have been envisaged on the basis of the following facts:

Unburnt components in the exhaust gases are in practice, detrimental only in the case of use of motor vehicles in towns and in inhabited areas in general, whereas there is virtually no problem in motorways or on open roads.

In the first case a very narrow power range is required, whereas high power is required only in the second instance. Thus a post-combustion of the exhaust gases is essential when the engine operates at low and middle power levels, whilst it is less not necessary when the engine operates at the fullest power. The automatic valves according to the present invention are characterized in that at some operating conditions an air flow is sucked in which is rather constant on varying the rpm of the engine; in fact the frequency of the pressure pulsations of the gases in the exhaust pipes is almost constant, as it essentially depends on the size of the discharge ducts (mainly in the case of ram-pipes, i.e. discharge ducts from the single cylinders which are sized so as to improve the engine performance), whereby and the number of peaks of negative pressure for each operating cycle is inversely proportional to engine rpm. As a consequence, since the flow rate of the exhaust gases increases with the engine rpm, the air fed by the automatic valves is rather high proportion of the exhaust gases or of the air intake at low running conditions, whereas it is a minor proportion of these gases or of air intake at the higher power operation.

Through the particular positioning and sizing of the automatic valves according to the present invention, the proportion of air fed in the exhaust gases is wholly sufficient at the highest rpm and power, whereas it becomes quite excessive at reduced rpm and power, thus causing the gases to be cooled down and the starting of the oxidizing reaction to be difficult; thus, an adjustment of the air flow sucked in by the automatic valve and a flow rate reduction at the lowest powers becomes necessary. It has been thus provided, together with the automatic valves, a device for the throttling of the air flow rate, mounted in the duct for the air feeding to said valves moveover, for the operation of the said throttling device an actuating member is provided, which is responsive to the mean negative pressure of the gases in the exhaust pipes, which pressure increases proportionally to the rpm and the power; of course, the mechanical connection between said device and said actuating member is arranged so that the lower is the pressure in the exhaust ducts, the lower is the available passage section for the air, and respectively the greater is the said pressure, the greater is the said passage section. In the device, the passage section of the air is completely open when said pressure is higher than a predetermined level, whereas decreasing passage sections are available, thus reducing the air flow rate through the automatic valves, when the said pressure is less than said predetermined value.

What has been disclosed hereinbefore can be better understood with the aid of the accompanying FIGS. 1 to 8 which are given by way of example only and are in no wise limitative, and which show diagrammat-

BRIEF DESCRIPTION OF THE DRAWINGS

FIG. 3 is a cross-sectional view taken along the line III—III of FIG. 4, and shows one of the valves which are a part of an assembly of four valves, with a 4-cylinder engine being illustrated.

FIG. 4 is a cross-sectional view taken along the line IV—IV of FIG. 3.

FIG. 5 is an enlarged view of a constructional detail, in cross-section taken along the line V—V of FIG. 4.

FIG. 6 shows an alternative embodiment of the automatic air-induction valves;

DETAILED DESCRIPTION OF THE EMBODIMENTS

Figure 1:
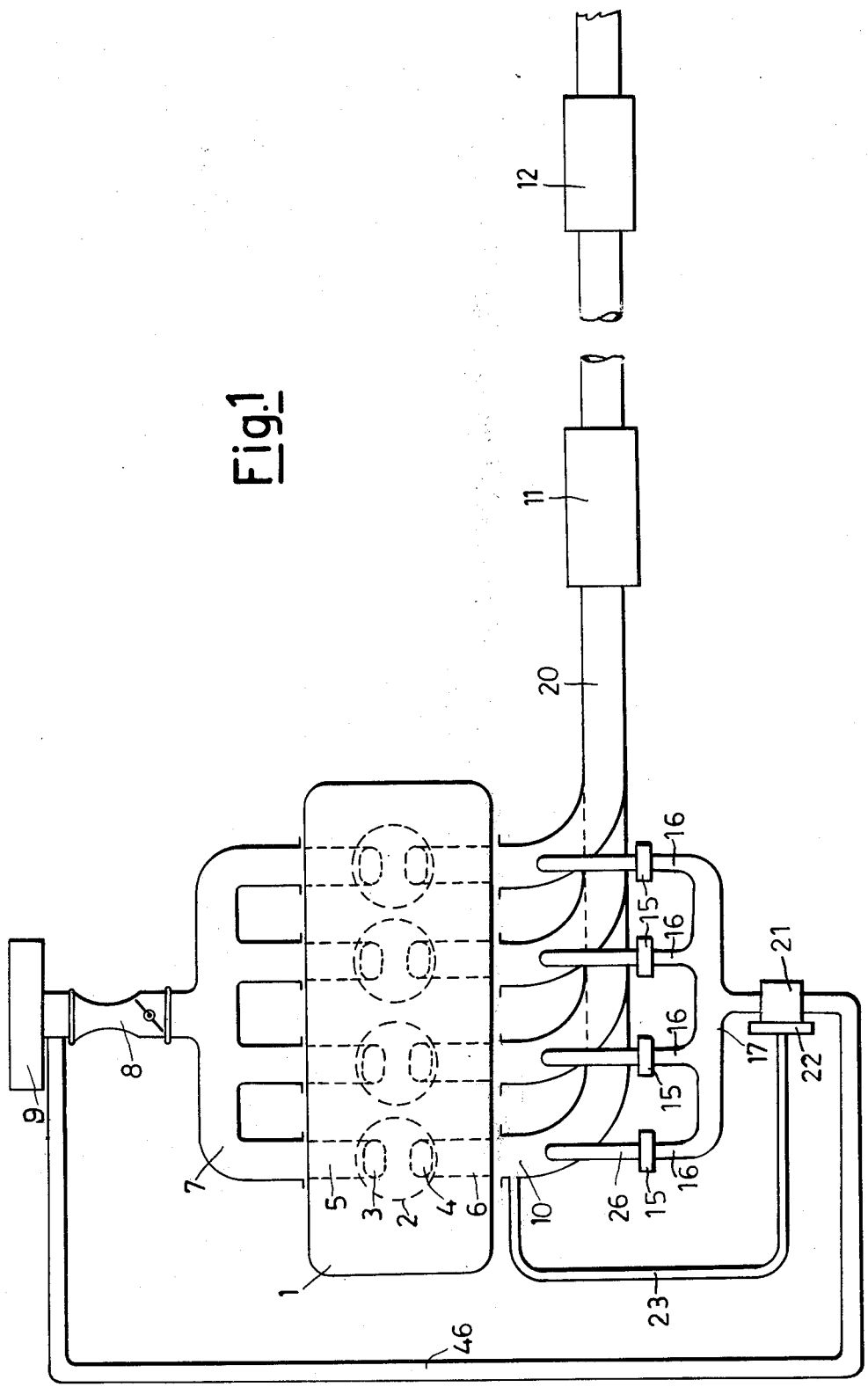
FIG. 1 shows an exhaust system of an internal combustion engine, equipped with automatic valves for feeding air into the exhaust gas flow.

In FIG. 1, the numeral 1 indicates the cylinder head and, at 2 are shown in dotted lines the cylinders and, at 3 in dotted lines, the intake valves, at 4 the exhaust valves, at 5 the intake ducts formed through the cylinder head and, at 6 the exhaust ducts, likewise formed through the cylinder head.

The cylinder head 1 is connected to an intake manifold 7 to which the mixture is fed from the carburetor 8, with the latter being fed with atmospherical air through an air filter 9.

The cylinder head is also connected, through individual exhaust pipes 10, to the exhaust system which comprises a duct 20 and mufflers 11 and 12. The air-induction system, formed by at least one automatic valve located in the exhaust system in the vicinity of the cylinder head, is composed, according to a preferred embodiment by automatic valves 15, individual pipes 16 which lead to the automatic valves the atmospherical air coming from manifold tube 17, and pipes 26 inserted in the individual exhaust ducts 10 in the vicinity of their connection to the cylinder head and through which air is introduced into the exhaust gas stream.

The manifold tube 17 draws air through duct 46 from the intake duct, just downstream of the filter 9. It is to be noticed that such an arrangement takes advantage of the sound absorbing properties of the filter 9, in order to deaden noises at the intake of the valves 15, and prevents the exhaust gases from being diffused, in case of a faulty seal of the same valves.

However, the manifold tube, if desired, can be directly open to the atmosphere.

By the reference 21 a valve is generally shown, which is mounted in the duct 46 upstream of the automatic valves 15; an actuator 22 therefor is in connection through the tube 23 to one of the single ducts 10, by which the gases discharged by the cylinders 2 are conveyed to the duct 20.

Figure 2:
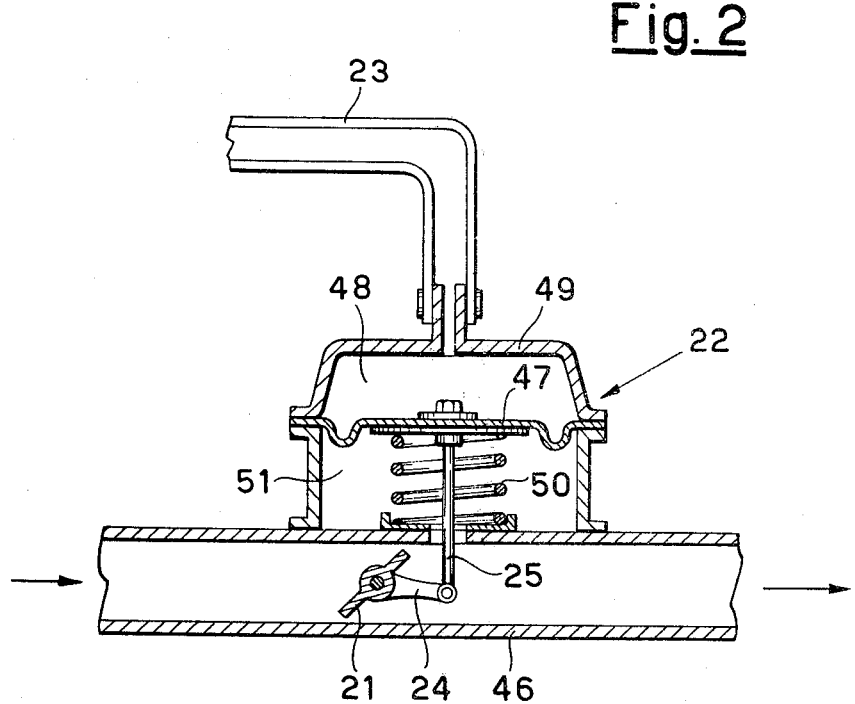
FIG. 2 shows an embodiment of the throttling device for the air sucked in by the automatic valves, and of the related actuating means.

The details of the valve and of the related actuator are more clearly shown in FIG. 2.

In this embodiment the valve 21 is of the throttle type and is linked by means of the lever 24 and the connecting rod 25 to the membrane 47. The cavity 48, as defined from the rigid wall 49 and the membrane 47, is connected by the tube 23 to one of the single exhaust ducts 10. The diameter of the tube 23 is very small and the cavity 48 has a sufficient volume, whereby the membrane 47 is subjected to the average value of the pulsating pressure existing in the duct 10. Of course, to have the pressure pulsations damped, the connection between the tube 23 and the duct 10 can also take place through a calibrated orifice.

The action of the pressure of the exhaust gases on the membrane 47 is counterbalanced by the spring 50, which is mounted in the chamber 51 in a suitably preloaded condition, e.g., by providing an adjustable stop for the throttle 21.

The automatic valves 15, which are detailedly shown in the FIGS. 4 to 6, are opened at each peak of negative pressure occurring in the ducts 10, and permit external air to pass in the stream of gases discharged from the engine.

Figure 8:
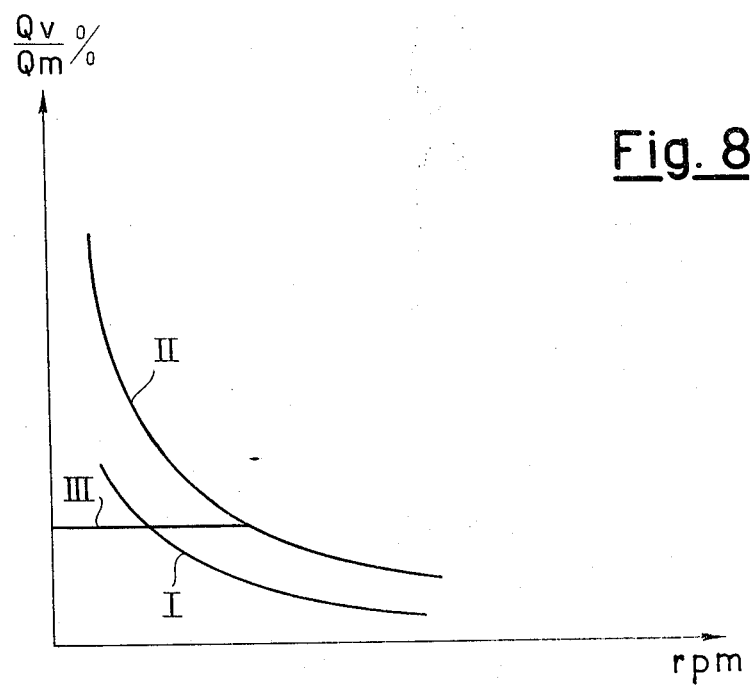
FIG. 8 is a graph qualitatively illustrating the variation, as a function of the engine rpm, of the ratio between the air flow rate fed by the automatic valves and the air intake of the engine.

In the graph of FIG. 8, the variation of the ratio $Q_v/Q_m$, between the air flow rate $Q_v$ fed by the automatic valves and the air intake $Q_m$ of the engine is shown as a function of the engine rpm; the curve I refers to the operation at the fullest power, whereas the curve II relates to the operation in normal conditions. As already stated, the flow rate of the air fed by the automatic valves is substantially constant on varying the engine rpm at the various operating conditions and therefore the ratio $Q_m/Q_v$ attains high values at the lowest powers.

The air flow rate fed by the automatic valve 15 is reduced, according to the present invention, by throttling the passage section of the duct 46 by means of the throttle 21. Therefore the ratio $Q_v/Q_m$ shows the constant value as represented by the curve III. By varying the pressure in the cavity 51 the membrane 47 takes several positions, in which the force due to the pressure is balanced by the load of the spring; as a consequence the valve 21 too rotates around the pin thereof, thus opening in the duct 46 a passage section gradually increasing with the increase of the same pressure.

Figure 7:
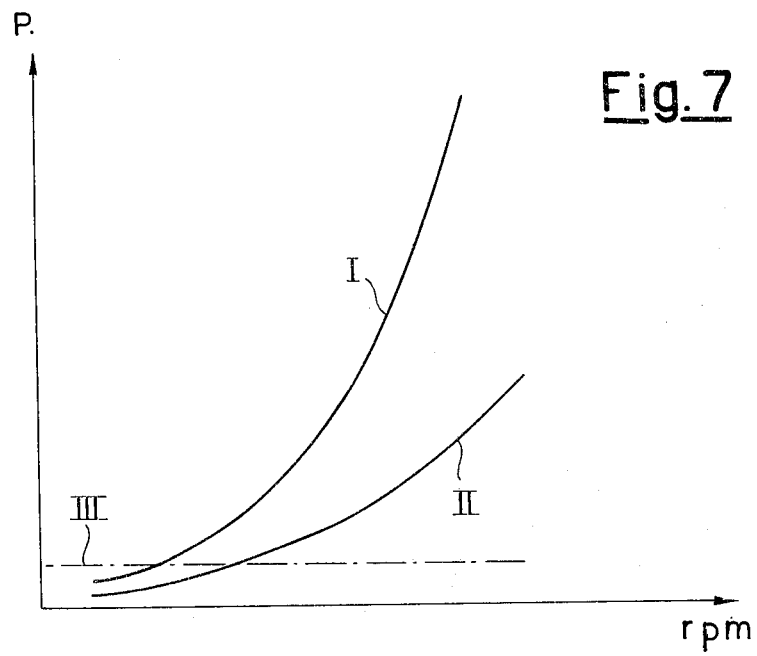
FIG. 7 is a graph qualitatively illustrating the average pressure of exhaust gases as a function of the engine rpm.

The pattern of the average pressure in each duct 10 is shown in FIG. 7, in which the curve I relates to the operation at the fullest power and the curve II to the operation in normal running conditions; the line III represents the upper limit of the operating range of the membrane and of the throttle. As long as the pressure is less than the predetermined value the throttle 21 gradually opens thus adjusting the air feed from the valves 15, so as to keep the ratio $Q_v/Q_m$ essentially constant; above the said predetermined value the throttle 21 remains in the completely open condition and the air feed provided by the said valves has a constant value, which for a certain calibration of the same valves is determined by the operating conditions of the engine.

In FIGS. 3, 4 and 5, the valves for introducing air into the exhaust gas stream are grouped in a single assembly, but, of course, each valve could be independent from the others. In said figures the numeral 29 indicates a valve assembly casing, 30 air intake ports for each valve, which can be directly opened to the atmosphere or, as shown in FIGS. 1 and 2, they can be connected to the pipes 16 which merge in the manifold 17, 31 are outlet ports for the air, relative to each valve, and to which there are connected the pipes 26 of FIG. 1.

The ports 30 and 31 are formed through walls 32 and 33, respectively, of the casing 29.

The walls 32 and 33, assembled by bolts 34 with a gasket 35 therebetween, form a cavity 36 in which metal blades 37 of the automatic valves are mounted. 38 and 39 indicate dowels which bind to the wall 32 the ends of each blade as opposite to the air intake port 30, and 27 is a resilient member, in the case in point a leaf spring, relative to each blade 37.

The end of each blade at the port 30 is free and the lifting stroke of the blade under the action of the negative pressures in the exhaust duct, is limited by a stop 28 as inserted in the wall 33 and possibly screw-threaded for permitting the adjustment of the stroke and varying the width of the substantially annular flow surface for air from the port 30 to the cavity 36.

In the valve as shown in FIG. 6, a thin leaf spring 40, having a substantially circular outline, is housed along with spring 41 in cavity 42 of casing 43 so that, during the lifting stroke, the blade by slide in the cavity, as guided by the sidewalls thereof, since the edges of the leaf spring are partially curled so as to obtain the air-passageway ports. In the cavity 42 a shoulder is provided for limiting the stroke of the leaf spring 40.

Through the bottom wall of the casing there are formed ports 44 and 45 for inducing atmospherical air into the cavity 42, and for discharging air therefrom, respectively. Of course, a single block of as many valves as there are cylinders in the engine can be made up with valves such as shown in FIG. 6, such as described in connection with the valves of the embodiment first described herein.

In order to obtain the highest operating efficiency, the automatic valves are designed so as to ensure the feeding of the air proportion needed for a good post-combustion at the intermediate conditions of engine operation; with reference to FIG. 1, if "D" is the diameter of the pipe 16 feeding air to the related valve 15, $d$ is the diameter of pipe 26 opening in the single exhaust duct 10, $h$ the opening stroke of the valve and $l$ the axial length of the pipe 26, up to its opening in the single duct 10, for a proper selection of these values, the following relationships must be fulfilled:

$d/D = 0.5 - 0.8$
$l/d = 0.5 - 14$
$h/D = 0.05 - 0.07$

Furthermore, in the particular case of automatic valves, as those shown in the FIGS. 3 – 5, for the said designing of these valves, account is to be taken of the fact that, besides the response quickness, a good resistance to thermal and mechanical stresses is required; by indicating with $a$ the length of the blade 37 between the hinge point and the point of maximum lift, at the stop 28, and with $s$ the thickness thereof, with P the weight (grams) and with K the stiffness of the spring (gr/mm), the following relationships are to be also fulfilled:

$s/a = 6.6 \times 10^{-3} - 8.3 \times 10^{-3}$
$P/K = 0.33 - 0.5$ (mm)

By the latter ratio, the shape of the blade being the same, the own frequency of the blade is controlled.

Atmospherical air entering through the automatic valves whenever the negative pressures in the pipes 10 cause the lifting of the leaf springs 37, or 40, and thus the opening of the valves, is admixed with the exhaust gases thus originating the oxidation reactions of the unburned components which are still present. These reactions will be more or less complete, but possibly, other devices can be adopted, which are capable of encouraging said reactions, such as, for example, catalytic mufflers or thermal reactors and the use of other expedients could be of advantage, such as thermal insulation of the exhaust ducts, in order that the gases may be kept hot even away of the cylinder head so as to facilitate the combustion.

What is claimed is:

1. A discharge system for the exhaust gases of an internal combustion engine for a motor vehicle in which the engine is provided with a cylinder head, cylinders in the head, on intake manifold communicating with the cylinders and an exhaust line, an exhaust duct for each cylinder, and having an optimized length, each exhaust duct communicating with the exhaust line, an air feeding duct opening into each exhaust duct, each air feeding duct having an automatic control valve and conduit means connecting said air feeding ducts upstream of said automatic control valve with the intake manifold whereby during engine operation said automatic control valves are cyclically opened and closed, with the opening taking place due to the negative pressures cyclically occurring in the individual exhaust ducts, with the opening allowing the intake of atmospherical air into the individual exhaust ducts downstream of said valves thereby obtaining a post combustion of the admixture of air with the unburned gases, said discharge system further comprising a throttling device for the control of the air fed by the said automatic valves, said device being mounted upstream of the automatic valves, and actuating means for said device comprising a sensing member responsive to average pressure of the exhaust gases in the said exhaust ducts, said device and said sensing member being connected so that the lower is the pressure in the exhaust ducts the lower is the passage section for the air in the throttling device and vice versa.

2. A discharge system according to claim 1, wherein the ratio between the diameter $d$ of the outlet duct of each valve and the diameter D of the air feeding duct to the same valve is between 0.5 and 0.8; the ratio between the length $l$ and the diameter $d$ of outlet duct of each automatic valve is comprised between 0.5 and 14 and the ratio between the lifting stroke of the valve and the diameter of the air feeding duct to the same valve is between 0.05 and 0.07.

3. A discharge system according to claim 1, wherein each automatic valve comprises a metal blade of essentially rectangular shape hinged at one end, elastic means acting on the blade so as to intercept the air flow from the air conduit to the duct feeding air to the related exhaust duct; the ratio between the thickness and the length of the blade being comprised between $6.6 \times 10^{-3}$ and $8.3 \times 10^{-3}$, whereas the ratio between the weight of the blade and the stiffness of the said elastic means is comprised between 0.33 and 0.5 mm.

4. A discharge system according to claim 1, including a post-combustion chamber.

5. The discharge system as claimed in claim 1 including a filter upstream of the intake manifold and the conduit means leading from the air feeding ducts communicating with the intake manifold downstream of the filter.

* * * * *